United States Patent [19]

Shiba

[11] Patent Number: 4,491,891
[45] Date of Patent: Jan. 1, 1985

[54] TAPE GUIDE FOR A MAGNETIC TAPE CARTRIDGE AND METHOD OF MANUFACTURING THE SAME

[75] Inventor: Haruo Shiba, Saku, Japan

[73] Assignee: TDK Corporation, Tokyo, Japan

[21] Appl. No.: 370,990

[22] Filed: Apr. 22, 1982

[30] Foreign Application Priority Data

Jun. 18, 1981 [JP] Japan ................................. 56-94547

[51] Int. Cl.³ ............................................. G11B 15/16
[52] U.S. Cl. ................................ 360/130.21; 360/90;
226/191; 242/76
[58] Field of Search ........................ 360/130.2–130.31,
360/90; 242/191–201, 76; 226/188–192

[56] References Cited

U.S. PATENT DOCUMENTS

| 4,054,929 | 10/1977 | Levy | 360/90 |
| 4,107,745 | 8/1978 | Burke, Jr. | 360/90 X |
| 4,122,504 | 10/1978 | Prozzo et al. | 360/130.21 X |
| 4,310,863 | 1/1982 | Lelandais | 360/130.21 X |

FOREIGN PATENT DOCUMENTS 57-152566  9/1982  Japan ............................ 360/130.21

*Primary Examiner*—John H. Wolff
*Attorney, Agent, or Firm*—Robert Scobey

[57] ABSTRACT

A tape guide for a magnetic tape cartridge and a method of manufacturing same is disclosed. The guide is of synthetic resin and provided with many minute protrusions on its tape-guiding surface to greatly reduce the area of contact between the tape guide and the magnetic tape guided thereby. The protrusions may by produced by utilizing synthetic resin material of a molding contraction ratio of about 0.8% or greater.

5 Claims, 4 Drawing Figures

TAPE GUIDE FOR A MAGNETIC TAPE CARTRIDGE AND METHOD OF MANUFACTURING THE SAME

BACKGROUND AND BRIEF DESCRIPTION OF THE INVENTION

This invention relates generally to a magnetic tape cartridge, and more particularly to a tape guide employed particularly in a VTR magnetic type cartridge for guiding a magnetic tape. The invention also relates to a method of manufacturing a tape guide.

A conventional magnetic tape cartridge is formed by fitting together top and bottom cases each molded of a synthetic resin material, and fitting paired supply and take-up reels within the cavity formed by the top and bottom cases, with a magnetic tape wound on the supply reel and extending between the supply and take-up reels. The magnetic tape cartridge is provided with a plurality of tape guide members for guiding the magnetic tape through a predetermined passage and for attaining satisfactory recording and reproducing by stabilizing the running of the tape.

Conventionally, metallic guide members have been employed to reduce friction between the magnetic tape and tape guides and to prevent damage of the tape by the tape guides, thereby to attain smooth tape guiding as well as to mitigate or to completely eliminate problems liable to occur during the running of the tape. Furthermore, it is usual to form tape guides with a non-magnetic stainless steel material, to avoid magnetization of those guides. Accordingly, the smoothness of the surface of the tape guides is significant, as is the finishing of the tape contact surface of the guides.

A conventional tape guide formed with a nonmagnetic stainless steel material, however, has the disadvantages that the material is expensive and the production is high in cost and low in productivity, since the surface of the guide requires surface finishing, and stainless steel materials commonly have inferior machinability. Furthermore, the finished surface of the metallic tape guide is susceptible to being damaged after the surface finishing process but before the guide is incorporated into the cartridge; therefore, extremely careful handling is required of the metallic tape guide during this time. Such a requirement is one of the factors disadvantageously affecting the mass production of magnetic tape cartridges.

A tape guide made of a synthetic resin material has been proposed to eliminate the above-noted disadvantages of a metallic tape guide. However, such a guide has not been entirely satisfactory. Specifically, the proposed guide has the serious disadvantages that the friction between the guide and the tape is remarkably increased due to close adhesion of the tape to the smooth surface of the guide, and powder produced due to wear of the surface of the tape adheres to the tape surface, causing drop-out.

Accordingly, an object of the present invention is to provide a new tape guide which eliminates the disadvantages of conventional tape guides, and also a method of manufacturing the same.

The principal object of the present invention is to provide a tape guide of a synthetic resin and a method of manufacturing the same, wherein the tape guide is provided with many minute protrusions on the tape-guiding surface to greatly reduce the area of contact between the tape guide and the magnetic tape, thereby to decrease the friction between the tape guide and the magnetic tape and to attain stabilized running of the tape.

Another object of the present invention is to provide a method of manufacturing the tape guide requiring no machining process, especially the process for finishing the tape contact surface of the tape guide, and particularly suitable for mass-producing the tape guide. This object is achieved by utilizing a synthetic resin material of a molding contraction ratio of about 0.8% or greater.

A tape guide according to the present invention will be described in the following detailed description.

DETAILED DESCRIPTION

Figure 1:
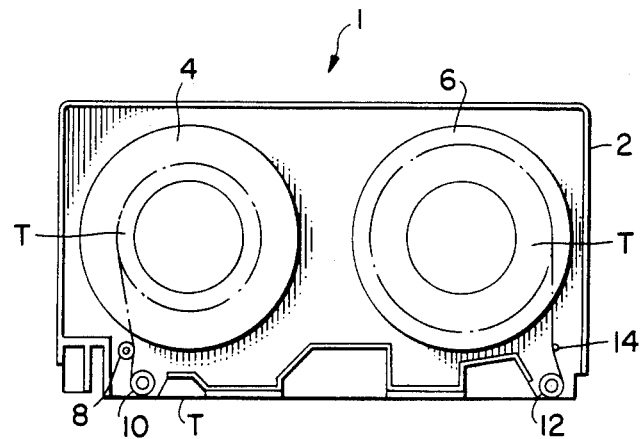
FIG. 1 is a schematic sectional plan view of a magnetic tape cartridge for a VTR, which may incorporate tape guides according to the invention.

FIG. 1 shows an exemplary conventional magnetic tape cartridge 1 for a VTR, in which the top half case is removed to facilitate the observation of the internal construction of the cartridge. A magnetic tape T is fed from a feed reel 4 disposed on a bottom half case 2 to a take-up reel 6. The magnetic tape T is guided from the feed reel 4 to the working section formed on the front side of the cartridge through tape guide members 8, 10 and 12, and then to the take-up reel 6 through a tape guide member 14. The tape guide members 10 and 12 are fixedly fitted on pins formed in a single member together with the bottom half case 2, while the tape guide member 8 is a rotary guide roller. The tape guide member 14 is a guide pole fixedly fitted in a hole formed in the bottom half case 2. The number, the disposition and the construction of the tape guide members disposed within a magnetic tape cartridge are not limited to those shown in FIG. 1 and are subject of various modifications which are capable of securing the stabilized running of a magnetic tape.

Figure 2:
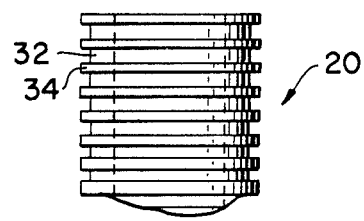
FIGS. 2 to 4 are enlarged fragmentary elevations of various tape guides embodying the present invention.
Figure 3:
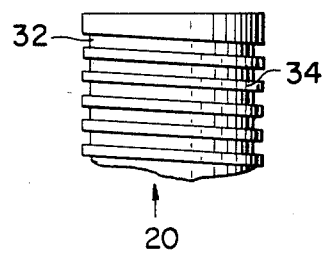
Figure 4:
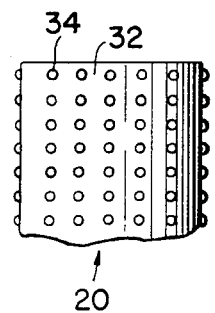

FIGS. 2 to 4 show presently preferred tape guides embodying the present invention. A tape guide 20 (FIG. 2) is in the form of a cylindrical tape guide roller having on the outside surface thereof protrusions 34 and concomitant recesses 32 in an alternate arrangement. Generally, the outside diameter of the tape guide roller is 6 mm, the protrusions 34 are 0.01 to 0.1 mm in width and 0.05 to 0.15 mm in intervals, and the recesses 32 are 5 to 20μ in depth from the outside surface. When the tape guide is used as a tape guide pole, the tape guide may be 2.6 mm in outside diameter, and the dimensions and the disposition of the protrusions 34 and the recesses 32 may be within the ranges of the dimensions and the disposition for the tape guide roller as described above.

The recesses 32 and the protrusions 34 formed on the outside surface of the tape guide 20 may be formed by parallel strips perpendicular to the axis of the guide (FIG. 2), generally helical strips arranged at an angle to the guide axis (FIG. 3), or small projections of 0.005 to 0.020 mm in height and 0.01 to 0.1 mm in diameter distributed uniformly over the outside surface of a guide roller with intervals of 0.05 to 0.15 mm (FIG. 4). It is obvious that the same effect can be obtained with a guide roller provided with many recesses formed over the outside surface thereof (not shown). The tape guide thus formed is capable of reducing adhesion and friction between the surface of the guide and the magnetic tape and also of attaining stabilized running and guiding of the magnetic tape.

The tape guide 20 of the present invention is preferably made of a synthetic resin material, suitably of a crystalline resin of polyacetal, polyethylene or polyamide. The minute protrusion-recess shape of the tape guide 20 can be formed through a secondary process, such as etching or machining. However, it is desirable to form the minute protrusion-recess shape during the molding process. It has been found that a tape guide having an extremely smooth molded outside surface can easily be removed from a unitary metal mold neither by splitting the metal mold nor by forcibly pressurizing, when a tape guide of 6 mm in outside diameter and 0.005 to 0.02 mm in the depth of the recess (the height of the protrusion) is molded with a synthetic resin material having a molding contraction ratio of 0.8% or greater, since the synthetic resin material contracts after it is injected into the unitary metal mold. According to this method, the tape guide is not subject to damage; therefore, tape guides having extremely smooth surfaces are produced. Accordingly, the manufacturing process is remarkably simplified, since no secondary process or finishing is required. This present method is capable of attaining the mass production of tape guides.

The invention is defined by the following claims.

I claim:

1. A cylindrical tape guide with protrusions on the surface for a magnetic tape cartridge, characterized in that said tape guide is made of one of polyacetal resin, a polyethylene resin, and a polyamide resin, with a molding contraction ratio of greater than about 0.8%, and said protrusions are isolated small projections molded on the surface of the tape guide.

2. A tape guide according to claim 1, wherein said tape-guiding surface is generally cylindrical, and said protrusions are arranged in generally parallel strips on said tape-guiding surface.

3. A tape guide according to claim 1, wherein said tape-guiding surface is generally cylindrical, and said protrusions are arranged generally helically on said tape-guiding surface.

4. A tape guide according to claim 2 or 3, wherein said protrusions extend away from said tape-guiding surface for a distance between about 0.005 and 0.02 mm, and the width of said protrusions is between about 0.01 and 0.1 mm, and adjacent protrusions are generally spaced apart by between about 0.05 and 0.15 mm.

5. A tape guide according to claim 1, wherein said isolated small projections have a diameter between about 0.01 and 0.1 mm and extend away from said tape-guiding surface for a distance between about 0.005 and 0.020 mm, and each of said small projections is spaced from adjacent projections by between about 0.05 and 0.15 mm.

* * * * *